United States Patent [19]
Hilty et al.

[11] Patent Number: 5,171,809
[45] Date of Patent: Dec. 15, 1992

[54] SILICONE POLYMERS, COPOLYMERS AND BLOCK COPOLYMERS AND A METHOD FOR THEIR PREPARATION

[75] Inventors: Terrence K. Hilty, Midland; Anthony Revis; Howard M. Bank, both of Freeland; David P. Jones, Midland, all of Mich.

[73] Assignee: Dow Corning Corporation, Midland, Mich.

[21] Appl. No.: 421,897

[22] Filed: Oct. 16, 1989

[51] Int. Cl.$^5$ .............................................. C08H 30/08
[52] U.S. Cl. .................................. 526/279; 526/190; 526/194
[58] Field of Search .............................. 526/279, 194

[56] References Cited

U.S. PATENT DOCUMENTS 4,414,372  11/1983  Farnham et al. .................. 526/190
4,417,034  11/1983  Webster ............................ 526/194
4,588,795  5/1986  Dicker et al. ..................... 526/192

OTHER PUBLICATIONS

Preparation and Morphology of a Silicon-Acrylate Copolymer System Author: Todd R. Williams 1986.
Group Transfer Polymerization, Polymerization of Acrylic Monomers Author: Dotsevi Y. Sogan et al. 1986.

*Primary Examiner*—Paul R. Michl
*Assistant Examiner*—Tae H. Yoon
*Attorney, Agent, or Firm*—Sharon K. Severance

[57] ABSTRACT

Novel silicone acrylate polymers and a method for their preparation is disclosed. These polymers are formed from silicone acrylates, silicone diacrylates, or mixtures with organic acrylates. The copolymer formed from the reaction mixture of silicone acrylates and organic acrylates is useful in enhancing glass reinforced polyesters.

38 Claims, No Drawings

SILICONE POLYMERS, COPOLYMERS AND BLOCK COPOLYMERS AND A METHOD FOR THEIR PREPARATION

This invention relates to novel silicone acrylate polymers, copolymers and block copolymers. This invention also relates to a novel method used to produce the silicone polymers, copolymers and block copolymers. This invention also relates to improvement of glass reinforced polyesters by the addition of silicon acrylate copolymers to the glass.

BACKGROUND OF THE INVENTION

Polymerization of organic acrylate monomers or mixtures thereof is well known in the art. One such method as described in U.S. Pat. Nos. 4,417,034 to Webster and 4,414,372 to Farnham et al. teaches a method in which the acrylate is polymerized in the presence of a catalyst and an initiator. This method is commonly referred to as Group Transfer Polymerization. The acrylates introduced into the reaction can be of one species producing homopolymers or several different species producing copolymers. Because of the ability to create "living" polymers it is possible to produce both random and structured copolymers by controlling the order of addition of materials.

A "living" polymer, as defined by Webster and by Farnham, et al., is one which contains active terminal group(s) and is capable of polymerizing further in the presence of the catalyst and an acrylate. A terminated, or non-living, polymer is not capable of further polymerization by the group transfer polymerization method.

A common initiator for this process is a silyl ketene acetal. Although this is a siloxy-functional compound it is never incorporated into the polymer unless the polymer is maintained in the living form. At that point it is incorporated only at the polymer ends and is not along the polymer backbone. The siloxy functionality is removed from the polymer ends when the living form is terminated.

Numerous pieces of literature report on the studies that have been done on the types of acrylates, catalysts, and initiators that are applicable in the above described method for acrylate polymerization. Of the acrylates studied the number that contain silicones or siloxanes appears to be limited. It also appears that the use of organic diacrylates and silicone diacrylates which result in block copolymers has also been limited.

Both Farnham et al. and Webster teach the use of siloxy containing acrylates for use in the polymerization process. These compounds like the initiator are present along the polymer chain while in the living form. However upon termination of the reaction the siloxy group is removed from the polymer backbone resulting in a polymer that is essentially organic.

U.S. Pat. No. 4,588,795 to Dicker et al. teaches novel catalysts which are useful in the method as taught by Farnham et al. and Webster. These catalysts, in particular, are oxyanions and salts comprising suitable cations.

Other methods have been developed for acrylate polymerization. Most of these result in a polydispersed polymer, i.e. high molecular weight distribution, and require the use of a peroxide type catalyst for free radical addition.

Novelty arises in this invention due to the use of silicone acrylates that are incorporated into the polymer backbone, in both living and non-living form, and the ability to provide monodispersed polymers or those with a narrow molecular weight distribution.

It is an object of this invention to show novel silicone acrylate polymers, copolymers and block copolymers produced from silicone acrylates, silicone diacrylates, organic acrylates and mixtures thereof.

It is also an object of this invention to show a novel method for producing silicone acrylate block copolymers.

It is also an object of this invention to show improved glass reinforced polyesters by the addition of silicon acrylate polymers or copolymers to the glass.

THE INVENTION

In this invention monomers of silicone mono-acrylates or diacrylates (herein referred to only by silicone acrylate) and silicone acrylate or diacrylate/organic acrylate mixtures (herein referred to by acrylate mixture) are reacted to form novel polymers. The reaction requires the use of a catalyst and an initiator as well as the monomers of the desired silicone acrylate or acrylate mixture to create the polymers. These polymers may be produced as living polymers or can be terminated, producing a non-living polymer, by treating them when the desired degree of reaction has been achieved.

Various types of polymers can be produced by the method of this invention. These include living and non-living homopolymers, copolymers or block copolymers. Any of the aforesaid polymers can be structured, those that contain specific units along the polymer chain, or random, those that contain no set structure along the polymer chain.

Silicone acrylates useful in this invention are of the general formula

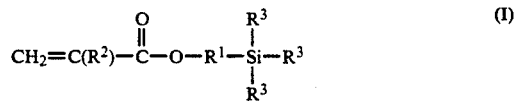

wherein $R^1$ is selected from a straight or branched chain alkylene group having 1 to 6 carbons and an arylene group having 6 to 10 carbons; $R^2$ is selected from the methyl group and the hydrogen atom; and each $R^3$ is independently selected from an alkyl or alkoxy group having 1 to 4 carbons and an aryl group having 6 to 10 carbons.

Silicone diacrylates useful in this invention are of the general formula:

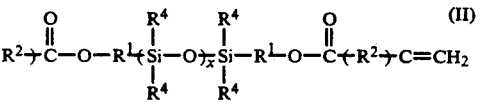

wherein $R^1$ and $R^2$ are described as previously; each $R^4$ is independently selected from an alkyl group having 1 to 4 carbons or an aryl group having 6 to 10 carbons; and x has the value of 1 to 25.

The above mentioned silicone acrylates (I and II) may be used independently, in mixtures thereof or in mixtures with organic acrylates of the formula

or

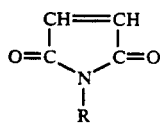

(IV)

wherein

X is selected from —CN, —CH=CHC(O)X' or —C-(O)X';

Y is selected from —H, —CH$_3$, —CN or —CO$_2$R provided that Y is —H or —CH$_3$ when X is —CH=CH-C(O)X';

X' is selected from —R, —OR, or —NR$^5$R$^6$;

R is selected from an alkyl, alkenyl, or alkadienyl group having 1 to 20 carbons and an aryl, alkaryl or aralkyl group having 6 to 20 carbons; any of said groups optionally containing one or more ether oxygen atoms within the aliphatic segments thereof; and optionally containing one or more functional substituents that are unreactive in said reaction; and each of R$^5$ and R$^6$ is independently selected from an alkyl group having 1 to 4 carbons.

Organic acrylate monomers useful in this invention and commercially available may be further exemplified by methyl acrylate, methyl methacrylate, butyl methacrylate, sorbyl acrylate and methacrylate, lauryl methacrylate, ethyl acrylate, butyl acrylate, acrylonitrile, methacrylonitrile, 2-ethylhexyl methacrylate, 2-(dimethylamino)ethyl methacrylate, 2-(diethylamino)ethyl acrylate, 3,3-dimethoxypropyl acrylate, 3-methacryloxypropyl acrylate, 2-acetoxyethyl methacrylate, p-tolyl methacrylate, N,N-dimethyl acrylamide, 2-methacryloxyethyl acrylate, glycidyl methacrylate, 3-methoxypropyl acrylate, phenylacrylate, allyl acrylate and methacrylate. The preferred organic monomer in this invention is methyl methacrylate.

Initiators useful in this invention are of the general formula (R$^7$)$_3$SiZ wherein each R$^7$ is independently selected from an alkyl group having 1 to 10 carbons and an aryl or alkaryl group having 6 to 10 carbons; Z is selected from the following activating groups,

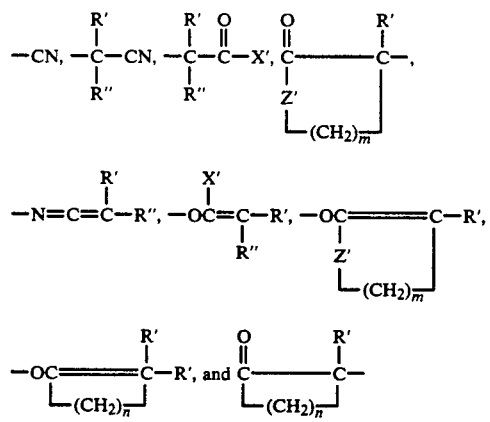

and mixtures thereof wherein:

X' is —OSi(R$^7$)$_3$, —R, —OR, AND —NR$^5$R$^6$;

each of R' and R" is independently selected from the hydrogen atom, an alkyl or alkenyl group having 1 to 10 carbons, an aryl, alkaryl, and aralkyl group containing 6 to 10 carbons; any of said groups optionally containing one or more ether oxygen atoms within aliphatic segments thereof and optionally containing one or more functional substituents that are unreactive in said reaction;

R, R$^5$, R$^6$ and R$^7$ are as previously described

Z' is selected from O and N;

m has the value of 2 to 4 n has the value of 3 to 5.

Organostanne and organogermane initiators may also be useful in this invention when they are of similar structure as the siloxy functional initiators described previously.

These initiators may be further exemplified by {(1-methoxy-2-methyl-1-propenyl)oxy}trimethylsilane; 2-(trimethylsilyl)iso-butyronitrile; ethyl 2-(trimethylsilyl)acetate; trimethylsilyl nitrile; {(4,5-dihydro-2-furanyl)oxy}trimethylsilane; {(2-methyl-1-propenyldiene)bis(oxy)bis [trimethylsilane]}; {2-methyl-1-{2-methoxymethoxy)ethoxy}-1-propenyl)oxy}trimethylsilane; methyl {(2-methyl-1-(trimethylsilyloxy)-1-propenyl)oxy}acetate; {(1-(1-methoxymethoxy)-2-methyl-1-propenyl)oxy}trimethylsilane; {(2-ethyl-1-propoxy-1-butenyl)oxy}ethyldimethylsilane; 2-(trimethylsilyl)propanenitrile; {(1-((1-dec-2-enyl)oxy)-2-methyl-1-propenyl)oxy}trimethylsilane; methyl 2-(triethylsilyl(acetate; {(1-methoxy-2-methyl-1-propenyl)oxy}-phenyldimethylsilane; {(2-methyl-1-[2-trimethylsiloxy)ethoxy}-1-(propenyl)oxy]trimethylsilane; and others.

The initiators useful in this compound are either commercially available, known compounds, or prepared from known starting materials. Initiators should be used in levels of 0.1 to 10 percent by weight based on the quantity of silicone acrylate or acrylate mixture present. The preferred initiator of this invention is {(1-methoxy-2-methyl-1-propenyl)oxy}trimethylsilane.

The activating group of the initiator, -Z, is incorporated onto a polymer end. Incorporation of the activating group at the polymer end can provide sites suitable for further reactions such as cross linking, chain extension, and chain branching and for polymer modification by UV radiation, water sorption and others. The remaining portion of the initiator, (R$^7$)$_3$Si—, is incorporated onto the opposite polymer end when the polymer is in the living form. Upon termination, the group (R$^7$)$_3$Si— is removed from the polymer end through reaction with a hydroxylic material.

Catalysts useful in this invention are those which are anions particularly those that contain a source of fluoride, cyanide, azide ions or are oxy-anions. The oxy-anions include carboxylate, phenolate, sulfinate, phosphinate, sulfonamidate and perfluoroalkoxide anions. These catalysts are either known compounds or can be prepared from known starting materials. Examples of those useful in this invention tris(dimethyamino)sulfonium bifluoride, 3-chlorobenzoate, tetrabutylammonium fluoride, tris(dimethylamino)sulfonium difluorotrimethylsilicate, tris(dimethylamino)sulfonium cyanide, tetraphenylarsonium cyanide, tris(dimethylamino)sulfonium azide, tetraethylammonium azide, tetramethylammonium fluoride, tetraethylammonium cyanide, 4-cyanobenzoate, phenolate, 4-trifluoromethyl benzoate, 3-nitrobenzoate and others. The preferred catalysts are 3-chlorobenzoate and tetrabutylammonium fluoride.

Catalysts should be used at levels of 0.01 to 5 percent by weight based on the quantity of silicone acrylate or acrylate mixture present. The catalyst may be used in its pure form or it may be dissolved in a suitable solvent. If a solvent is chosen it must be one that the catalyst is sufficiently soluble in.

Although catalysts containing fluoride are useful in this invention, degradation of the silicone acrylate may occur in their presence. This degradation may possibly only be in amounts equal to the concentration of the catalyst employeed.

The process for preparing the polymers is preferably carried out by combining the silicone acrylate or acrylate mixture, the catalyst and the initiator at ambient temperature but may also be done at temperatures ranging from about $-100°$ C. to $150°$ C. The process may require a period of initiation before any visible reaction takes place. By visible it is meant any noticeable change in the process conditions, such as composition, phase, temperature and pressure, that is brought about through the resulting reaction.

The introduction of the materials into the reaction can be varied. One such method is to add the catalyst to a solution containing the silicone acrylate or acrylate mixture and the initiator. Another method is to add the initiator to a solution containing the silicone acrylate or acrylate mixture and the catalyst. A third such method is to add the silicone acrylate or acrylate mixture to a solution containing the catalyst and the initiator. The preferred method is to add the catalyst to a solution containing the silicone acrylate or acrylate mixture and initiator.

The reaction may also be carried out in the presence of a solvent. Solvents suitable in this invention are aprotic liquids in which the catalyst, initiator, and acrylates are sufficiently soluble for the reaction to occur. These solvents should be relatively free of water or other hydroxylic contaminants when creating living or structured polymers. These solvents may be further exemplified by ethyl acetate, proprionitrile, toluene, xylene, bromobenzene, dimethoxyethane, diethoxyethane, diethylether, N,N-dimethyl-formamide, N,N-dimethylacetamide, N-methylpyrrolidone, anisole, acetonitrile, tetrahydrofuran and others.

If an acrylate mixture is being used the addition of the varying acrylates can be carried out in two ways. The first is to combine them together and introduce them both simultaneously into the reaction mixture. The other way is to introduce them separately, allowing each one to react completely before introducing the next. When adding each acrylate independently it may be necessary to add additional amounts of catalyst for the reaction to proceed.

If using an acrylate mixture, the ratio of silicone acrylate to organic acrylate used to form the polymer can be varied. Mixtures, from those that are essentially all silicone acrylates and contain small amounts of organic acrylates to those that are essentially all organic and contain small quantities of silicone are applicable. The preferred ratio when producing polymers from acrylate mixtures is from 0.1:1 moles of silicone acrylate to organic acrylate to 20:1 mole of silicone acrylate to organic acrylate. Mixtures of various silicon acrylates are also useful and may contain levels of each silicone acrylate necessary to achieve any desired properties.

The reaction, producing living polymers, may be terminated, thereby producing non-living polymers, by the addition of a hydroxylic substance into the reaction mixture. This hydroxylic substance may be introduced into the polymer by the addition of materials such as methanol or water, exposure of the living polymer to moisture in the air or by contacting it with an aprotic solvent that is not free of moisture. If a hydroxylic material is initially present in the reaction mixture it is possible to directly produce a non-living polymer.

Polymers produced by the method of this invention using silicone diacrylates or silicone diacrylate/organic acrylate mixtures have applications in release coatings, contact lenses, electronics, adhesives, etching release, medical membranes, sealants, and other coatings.

Polymers produced by the method of this invention using silicone mono-acrylates or silicone mono-acrylate/organic acrylate mixtures hold particular usefulness as adhesion promoters in glass reinforced polyesters.

The glass reinforced polyesters are produced by diluting in alcohol the polymer produced by the method of this invention in which a silicone acrylate and organic acrylate mixture is reacted; coating glass fibers with the polymer; allowing the alcohol to evaporate; applying a polyester to treated glass fibers and; curing the polyester.

These glass reinforced polyesters are produced by diluting the polymer produced from a silicone acrylate and organic acrylate mixture in a alcohol. It is preferred that the polymer be in the non-living form. The preferred alcohol is isopropyl alcohol, however, alcohols such as methanol, ethanol, butanol and others are applicable. A solution in which the polymer is emulsified in water may be useful as a method of providing a dilute solution of polymer for application to the glass.

The polymer is dissolved in the alcohol at concentrations from 0.01 to 1.0 percent by weight and if desired can be allowed to stand at room temperature for a period of time or it may be used immediately. It is preferred to maintain a solution consisting of 0.1 to 0.3 weight percent of the polymer in the alcohol.

The polymer/alcohol solution is applied to glass fibers until the fibers are completely wetted. Application may be achieved by methods such as dipping, spraying, wiping, pouring and others with care taken not to damage the fibers during the application process. The glass fiber may first be cut to the desired strand length, left as a continuous unit, woven into a cloth or others before treating them with the silicone acrylate polymer solution.

After treatment the fibers are dried to remove the alcohol. The preferred method for drying is to allow the fibers to stand (dripping) at room temperature for a period of time such that most of the alcohol is removed and then removing any remaining amounts of alcohol using a source of heat such as an oven or others.

The treated fibers are coated or mixed with the appropriate polyester/catalyst solution and cured. Polyester systems that can be cured at room temperatures or by the introduction of heat (heat cured) are useful. Polyesters and catalysts that are known and commercially available are applicable in this invention. Such systems may also contain accelerators or promoters. Examples of such Polyesters are ATLAC 400 produced by ICI Americas (curable at room temperature) and KOPPERS 6000-25 (curable with heat). Catalysts employed in this invention are also those that are known and/or commercially available. These catalysts may be further exemplified by benzoyl peroxide and methylethylketone peroxide and others.

So that those skilled in the art can understand and appreciate the invention taught herein, the following examples are presented, it being understood that these examples should not be used to limit the scope of this invention over the limitation found in the claims attached hereto.

PREP-EXAMPLE I

Preparation of 1,3-bis(3-methacryloxypropyl)tetramethyldisiloxane,

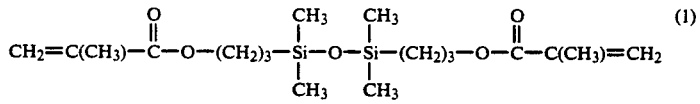

A stirred solution of 126 g (1.0 mole) of allyl methacrylate, 0.18 g (0.817 mmole) of 2,6-di-tert-butyl-4-methylphenol and 1.00 g of complex of chloroplatinic acid and 1,3-divinyltetramethyldisiloxane, prepared according the U.S. Pat. No. 3,419,593, under a 2% 02/98% N2 surface sweep was heated to 75° C. To this was added 94.0 g (1.0 mole) of dimethylchlorosilane at a rate to keep the temperature of the exothermic reaction at an average of 83° C. The resulting reaction mixture was stripped removing volatiles at 65° C. and 0.1 mm Hg. Gas Chromatograph (GC) analysis confirmed the presence of 78 percent by weight of 3-(chlorodimethyl-silyl)propyl methacrylate in the stripped reaction mixture.

786.2 g (43.7 mol) of water was added to a solution of 48 g (0.2 mole) of the 3-(chlorodimethylsilyl)propyl methacrylate and 72.0 g (1.0 mole) of tetrahydrofuran. This solution was allowed to sit under a hood until all the volatiles had evaporated. The water layer was separated and removed. The organic layer was washed with 500 ml of water, dissolved in ethyl ether and dried over molecular sieves and magnesium sulfate. The ethyl ether was then allowed to evaporate under a hood. Eighty one percent pure 1,3-bis(3-methacryoxypropyl)-tetramethyldisiloxane was obtained. Nuclear Magnetic Resonance Spectroscopy (NMR), Infraed Spectroscopy (IR), and Gas Chromatographic Mass Spectroscopy (GCMS) were used to confirm the identification of the product.

PREP-EXAMPLE II

Preparation of

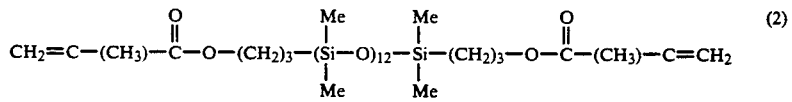

To a stirred solution of 200 g (0.1 mole) of

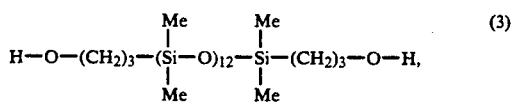

21.2 g (0.2) mole of triethylamine, 0.06 g (0.272 mmole) of 2,6-di-tert-butyl-4-methylphenol, and 400 ml of n-pentane in a 1000 ml round bottom flask was added 21.9 g (0.21 mole) of methacryloyl chloride. A thick white salt was formed. The salt mixture was filtered through a buchner funnel with Whatman #5 filter paper and the solvent was removed in vacuo. IR data confirmed that the desired dimethacrylate, 2, had been formed by the presence of a carbonyl peak (—C(O)—O) and the absence of an alcohol (—OH) peak.

PREP-EXAMPLE III

Preparation of 3-Chlorobenzoate Catalyst

A solution of 5.012 g (32 mmole) of 3-chlorobenzoic acid and 120 ml (49 mmole) of tetrabutylammonium hydroxide was extracted three times with 120 ml aliquots of methylene chloride. The resultant solution was then dried over sodium sulfate and filtered. Volatiles were removed in vacuo leaving a viscous oil which was dissolved and re-stripped three times with 100 ml aliquots of toluene. Upon the completion of the final stripping, white crystals began to form. The oil/crystals were dissolved in acetonitrile and gravity filtered. The acetonitrile was removed in vacuo and 14.63 grams of catalyst recovered. Enough acetonitrile was added to make a 0.5M solution of 3-chlorobenzoate catalyst.

EXAMPLE 1

To a solution of 0.5 ml of methyl methacrylate, 0.5 ml silicone dimethacrylate, formula 2, and 0.1 g of {(1-methoxy-2-methyl-1-propenyl)oxy}trimethylsilane in a 2 oz. vial was added 0.1 gram of 0.5M 3-chlorobenzoate catalyst prepared previously. After 1 minute, the vial containing the reactants became warm to the touch and a visible polymer formed.

EXAMPLE 2

To a mixture of 1.54 g (15 mmole) of methyl methacrylate, 0.20 g (0.98 mmole) of silicone dimethacrylate, formula 2, and 0.09 g (0.52 mmole) of {(1-methoxy-2-methyl-1-propenyl)oxy}trimethylsilane in a 2 oz. vial was added 0.10 g of 0.5M 3-chlorobenzoate catalyst. An exothermic reaction took place and a brittle polymer was quickly formed. This polymer was less brittle than a pure methyl methacrylate (MMA) polymer formed by the same reaction.

EXAMPLE 3

A solution of 1.5 g (15 mmole) of MMA, 0.31 g (0.152 mmole) of silicone dimethacrylate, formula 2, and 0.08 g (0.46 mmole) of {(1-methoxy-2-methyl-1-propenyl)oxy}trimethylsilane in 5.00 g of tetrahydrofuran was transferred by pipet to a 2 oz. vial. To this solution was added 0.13 g of 0.5M 3-chlorobenzoate catalyst. A slight exothermic reaction occurred. A few drops of methanol were added to quench the presumed living polymer, the solution was poured into an aluminum weighing dish, and the THF was allowed to evaporate. Several hours later a clear and flexible polymer film remained in the aluminum dish.

EXAMPLE 4

To a stirred solution of 0.04 g (0.23 mmole) of {(1-methoxy-2-methyl-1-propenyl)oxy}trimethylsilane, 1.00 g (10 mmole) of methyl methacrylate, and 0.25 g (0.12 mmole) silicone dimethacrylate, formula 2, was added a solution of 4.0 g tetrahydrofuran and 0.03 g of 0.5M 3-chlorobenzoate catalyst. An exothermic reaction resulted in a polymer. Gel Permeation Chromotography (GPC) data showed an average molecular weight of 1300 relative to polystyrene.

EXAMPLE 5

To 5 g of 1,3-bis(3-methacryloxypropyl)tetramethyldisiloxane, formula 1, was added 0.1 g of 3-chlorobenzoate catalyst followed by 0.1 g of {(1-methoxy-2-methyl-1-propenyl)oxy}trimethylsilane. An exothermic reaction occurred and within seconds a soft, flexible, and hazy to clear polymer had formed.

EXAMPLE 6

Three different ratios of methylmethacrylate to silicone dimethacrylate, formula 1, were used to prepare the polymers. In each experiment a total of 2 g of acrylate mixture, 5 g of tetrahydrofuran, 0.1 g of {(1-methoxy-2-methyl-1-propenyl)oxy}trimethylsilane and 0.1 g of 0.5M 3-chlorobenzoate catalyst were used. Runs were conducted at ratios (molar) of 1:1 methyl methacrylate to silicone dimethacrylate, formula 1, 5:1 and 10:1.

The general procedure use to prepare the polymers was to add the {(1-methoxy-2-methyl-1-propenyl)oxy}trimethylsilane to a 2 oz. vial containing the combined methacrylates and 3-chlorobenzoate catalyst in tetrahydrofuran (THF). Upon completion of the reaction the living polymer was quenched with methanol. The polymer was then placed in an aluminum dish and dried in vacuo in an oven at 50° C.

Each polymer resulted in different properties which are reported in Table I.

TABLE I

| | 2 gram acrylates, oven dried | | |
|---|---|---|---|
| | Methacrylate Ratio | | |
| | 1:1 | 5:1 | 10:1 |
| RESULTS | Exothermic Visible Gel THF trapped Clear polymer After drying, swelled in THF | Exothermic Clear THF trapped | Exothermic Clear MW = 6664 |

EXAMPLE 7

The same experiment was conducted as in Example 6 except only 1 gram total of the acrylates were used. Results are reported in Table II.

TABLE II

| | 1 gram acrylates, oven dried | | |
|---|---|---|---|
| | Methacrylate Ratio | | |
| | 1:1 | 5:1 | 10:1 |
| RESULTS | Exothermic Visible Gel THF trapped Clear polymer After drying, swelled in THF | Exothermic Clear MW = 5839 | Exothermic Clear MW = 4482 |

EXAMPLE 8

The same experiment was conducted as in Example 7 except the polymers were air dried in a hood at atmospheric pressure. Results are given in Table III.

TABLE III

| | 1 gram acrylates, air dried | | |
|---|---|---|---|
| | Methacrylate Ratio | | |
| | 1:1 | 5:1 | 10:1 |
| RESULTS | Exothermic Clear Film Tacky | Exothermic Clear Film Slightly Tacky Elastic | Exothermic Clear Film Smooth, hard surface |

EXAMPLE 9

A solution containing 10 grams (57.4 mmole) of {(1-methoxy-2-methyl-1-propenyl)oxy}trimethylsilane, 16 grams (64.5 mmole) of gamma-methacryloxypropyltrimethoxysilane and 8 grams (63.3 mmole) of allyl methacrylate was added dropwise over a period of 10 minutes to a stirred solution containing 100 g tetrahydrofuran and 1.0 ml tetrabutylammonium fluoride. An exotherm up to 55° C. was observed during the addition. When the reaction mixture had cooled to 30° C. an excess of methanol was added. Volatiles were removed in vacuo leaving a viscous (400 centistoke) fluid. GPC analysis showed a polymer with a molecular weight of 2500 and a polydispersity of 1.17.

EXAMPLE 10

A solution containing 10 grams (57.4 mmole) of {(1-methoxy-2-methyl-1-propenyl)oxy}trimethylsilane, 16 grams (64.5 mmole) of gamma-methacryloxypropyltrimethoxysilane and 8 grams (63.3 mmole) of allyl methacrylate was added dropwise over a period of 10 minutes to a stirred solution containing 100 grams of tetrahydrofuran and 1.0 ml of tetrabutylammonium fluoride. During the addition the temperature increased from 17° to 48° C. The reaction mixture was stirred for 10 minutes. 2.1 grams (14.8 mmole) of glycidyl methacrylate was added to the reaction mixture and stirred for 10 minutes. An additional 1 ml of tetrabutylammonium fluoride was added and stirred for an additional 10 minutes. Excess methanol was added and the volatiles were removed in vacuo leaving a polymer as the product.

EXAMPLE 11

300 grams of isopropyl alcohol was mixed with 0.6 grams of the polymer from example 9. Fiberglass cloth, style no. 7781, purchased from Burlington Glass Fabrics Co. was cut into a 26"×38" section and folded into a 6"×12" square. The polymer/alcohol solution was poured into a ceramic dish and the cloth was immersed into the solution until it was completely wetted. After soaking for about 1 minute, the cloth was removed and hung at room temperature for 30 minutes. It was then hung in an oven at 230° F. for 7 minutes.

The cloth prepared above was cut into (12) 8"×8" squares. 247.5 g of KOPPERS 6000-25 (an isophthalic polyester containing approximately 35% styrene) and 2.5 g of benzoyl peroxide were mixed and allowed to stand for one hour. A laminate was formed by alternating layers of the (12) 8"×8" sections of glass cloth and the polyester/catalyst solution. After allowing the laminate to stand for approximately 20 minutes at room temperature, a hard rubber roller was used to remove the air bubbles and create a relatively uniform thickness. The laminate was then pressed at 250° C. in a 12"×12" WABASH Hydraulic Press Model #12-121 until 50 psi of pressure had been achieved and the laminate was 125 mils +/−3 mils thick. After 20 minutes in the press at 50 psi the 125 mil thick laminate was removed and allowed to cool overnight. The cellophane was removed and the laminate was allowed an additional 4 hours at 250° F. for post cure.

Using ⅛"×4" sections of the laminate, flexural strength was tested per ASTM 790D, Method I. Both dry flex and wet flex (24 hr. boil) were tested. A laminate (blank) was prepared as above except the glass was not treated with the polymer from example 9 for comparison purposes. The blank had a dry flex of 47,690 psi and a wet flex of 22,113 psi while the polymer treated laminate had a dry flex of 46,049 psi and a wet flex of 35,727 psi.

EXAMPLE 12

Using the polymer of example 9, a 300 g solution of polymer and alcohol was prepared and the cloth treated and dried as in example 11.

247 grams of ATLAC 400 ACT from ICI Americas (a terephthalic polyester containing approximately 45% styrene, accelerated with dimethyl aniline and promoted with cobalt Naphtenate) was mixed with 3 grams of methylethylketoneperoxide just prior to use.

A laminate was produced with the glass cloth and the polyester and allowed to stand at room temperature for about 15 minutes. It was placed in the press used in example 11 at room temperature (70° F.) until the polyester had solidified (about 15 minutes). The laminate was removed from the press and allowed to postcure 16 hours at room temperature. The cellophane was removed and the laminate was then post cured for an additional 4 hours at 212° F.

The laminate and a blank were tested for wet and dry flex strength as in example 11. The blank had a dry flex strength of 49,764 psi and a wet flex strength of 21,407 psi. The polymer treated laminate had a dry flex of 45,944 psi and a wet flex of 35,507 psi.

EXAMPLE 13

A laminate was prepared as in example 12 except the polymer from example 10 was used. The laminate had a dry flex of 45,392 psi and a wet flex of 33,142 psi.

What is claimed is:

1. A process of making silicone acrylate polymeric materials comprising
   (A) reacting
      i) an acrylate of the general formula

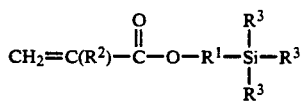

and mixtures thereof, in the presence of
      ii) an initiator of the formula $(R^7)_3SiZ$ and,
      iii) a catalyst which is a source of fluoride, cyanide, azide or oxy anions;
   (B) recovering the reaction product from (A); wherein:
   $R^1$ is selected from a straight or branched chain alkylene group having 1 to 6 carbons and an arylene group having 6 to 10 carbons; $R^2$ is selected from the methyl group and the hydrogen atom; each $R^3$ is independently selected from an alkyl or alkoxy group having 1 to 4 carbons and an aryl group having 6 to 10 carbons; each $R^7$ is independently selected from an alkyl group having 1 to 10 carbons and an aryl or alkaryl group having 6 to 10 carbons; and Z is selected from the group consisting essentially of

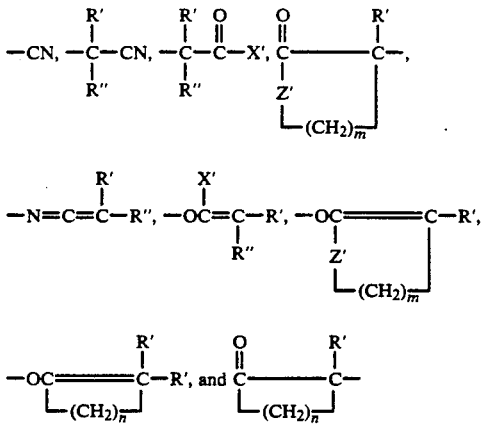

and mixtures thereof where
   X' is $-OSi(R^7)_3$, $-R$, $-OR$, AND $-NR^5R^6$;
   each of R' and R" is independently selected from the hydrogen atom, an alkyl or alkenyl group having 1 to 10 carbons, an aryl, alkaryl, and aralkyl group containing 6 to 10 carbons; any of said groups optionally containing one or more ether oxygen atoms within aliphatic segments thereof and optionally containing one or more functional substitutents that are unreactive in said reaction;
   Z' is selected from O and N;
   m has the value of 2 to 4;
   n has the value of 3 to 5;
   each R is selected from an alkyl, alkenyl, or alkadienyl group having 1 to 20 carbons and an aryl, alkaryl or aralkyl group having 6 to 20 carbons; any of said groups optionally containing one or more ether oxygen atoms within the aliphatic segments thereof; and optionally containing one or more functional substitutents that are unreactive in said reaction;
   each $R^5$ and $R^6$ are independently selected from an alkyl group having 1 to 4 carbons and;
   $R^7$ is as defined above.

2. A process as claimed in claim 1 wherein the acrylate is gamma-methacryloxypropyltrimethoxysilane.

3. A process as claimed in claim 1 wherein the initiator is of the formula

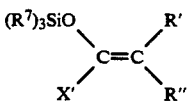

where $R^7$, R', R" and X' are as defined above.

4. A process as claimed in claim 1 wherein the catalyst is a source of oxy-anions.

5. A process as claimed in claim 4 wherein the catalyst is 3-chlorobenzoate.

6. A process of making silicone acrylate polymeric materials comprising
   (A) reacting
      i) an acrylate of the general formula

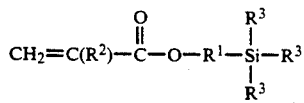

and mixtures thereof, in the presence of
ii) an initiator of the formula $(R^7)_3SiZ$ and,
iii) a catalyst which is a source of fluoride, cyanide, azide or oxy anions;

(B) terminating said reaction by the introduction of a hydroxylic material and;

(C) recovering the reaction product from (B); wherein:

$R^1$ is selected from a straight or branched chain alkylene group having 1 to 6 carbons and an arylene group having 6 to 10 carbons; $R^2$ is selected from the methyl group and the hydrogen atom; each $R^3$ is independently selected from an alkyl or alkoxy group having 1 to 4 carbons and an aryl group having 6 to 10 carbons; each $R^7$ is independently selected from an alkyl group having 1 to 10 carbons and an aryl or alkaryl group having 6 to 10 carbons; and Z is selected from the group consisting essentially of

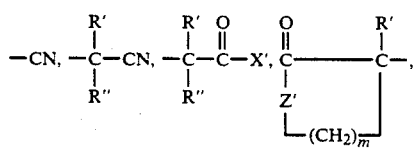

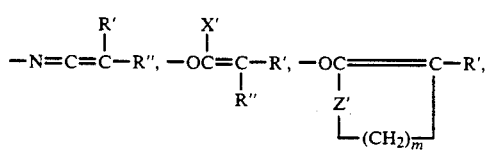

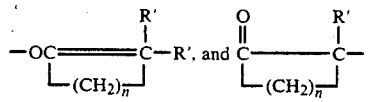

and mixtures thereof where
X' is $-OSi(R^7)_3$, $-R$, $-OR$, AND $-NR^5R^6$;
each of R' and R'' is independently selected from the hydrogen atom, an alkyl or alkenyl group having 1 to 10 carbons, an aryl, alkaryl, and aralkyl group containing 6 to 10 carbons; any of said groups optionally containing one or more ether oxygen atoms within aliphatic segments thereof and optionally containing one or more functional substituents that are unreactive in said reaction;
Z' is selected from O and N;
m has the value of 2 to 4;
n has the value of 3 to 5;
each R is selected from an alkyl, alkenyl, or alkadienyl group having 1 to 20 carbons and an aryl, alkaryl or aralkyl group having 6 to 20 carbons; any of said groups optionally containing one or more ether oxygen atoms within the aliphatic segments thereof; and optionally containing one or more functional substituents that are unreactive in said reaction;
each $R^5$ and $R^6$ are independently selected from an alkyl group having 1 to 4 carbons and;

$R^7$ is as defined above.

7. A process of making silicone acrylate polymeric materials comprising
(A) reacting
(i) an acrylate of the general formula

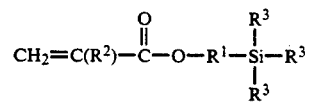

and mixtures thereof, and
ii) an organic acrylate selected from the group consisting of

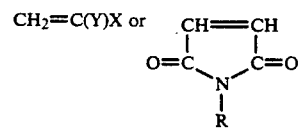

and mixtures thereof, in the presence of
iii) an initiator of the formula $(R^7)_3SiZ$, and
iv) a catalyst which is a source of fluoride, cyanide, azide or oxy anions and;

(B) recovering the reaction product from (A); wherein:

$R^1$ is selected from a straight or branched chain alkylene group having 1 to 6 carbons and an arylene group having 6 to 10 carbons; $R^2$ is selected from the methyl group and the hydrogen atom; each $R^3$ is independently selected from an alkyl or alkoxy group having 1 to 4 carbons and an aryl group having 6 to 10 carbons; R is selected from an alkyl, alkenyl, or alkadienyl group having 1 to 20 carbons and an aryl, alkaryl or aralkyl group having 6 to 20 carbons; any of said groups optionally containing one or more ether oxygen atoms within the aliphatic segments thereof; and optionally containing one or more functional substituents that are unreactive in said reaction; X is selected from $-CN$, $-CH=CHC(O)X'$, and $-C(O)X'$; Y is selected from $-H$, $-CH_3$, $-CN$ or $-CO_2R$ provided that Y is $-H$ or $-CH_3$ when X is $-CH=CHC(O)X'$; each $R^7$ is independently selected from an alkyl group having 1 to 10 carbons and an aryl or alkaryl group having 6 to 10 carbons; Z is selected from the group consisting essentially of

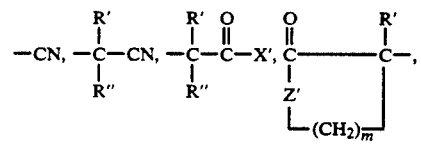

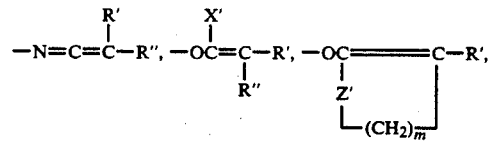

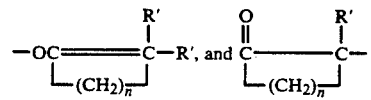

and mixtures thereof where

X' is —OSi(R$^7$)$_3$, —R, —OR, AND —NR$^5$R$^6$;

each of R' and R" is independently selected from the hydrogen atom, an alkyl or alkenyl group having 1 to 10 carbons, an aryl, alkaryl, and aralkyl group containing 6 to 10 carbons; any of said groups optionally containing one or more ether oxygen atoms within aliphatic segments thereof and optionally containing one or more functional substituents that are unreactive in said reaction;

Z' is selected from O and N;

m has the value of 2 to 4;

n has the value of 3 to 5;

each R$^5$ and R$^6$ are independently selected from an alkyl group having 1 to 4 carbons and;

R and R$^7$ are as defined above.

8. A process as claimed in claim 7 wherein the acrylate is gamma-methacryloxypropyltrimethxoysilane.

9. A process is claimed in claim 7 wherein the initiator is of the formula

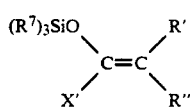

where R$^7$, R', R" and X' are defined above.

10. A process as claimed in claim 7 wherein the catalyst is a source of oxy-anions.

11. A process as claimed in claim 10 wherein the catalyst is 3-chlorobenzoate.

12. A process as claimed in claim 7 wherein the catalyst is tetra-N-butylammonium fluoride.

13. A process as claimed in claim 7 wherein the organic acrylate is allyl methacrylate.

14. A process as claimed in claim 7 wherein the organic acrylate is methyl methacrylate.

15. A process as claimed in claim 7 wherein the organic acrylate is glycidyl methacrylate.

16. A process as claimed in claim 8 wherein the organic acrylate is a mixture consisting of allyl methacrylate and glycidyl methacrylate.

17. A process of making silicone acrylate polymeric materials comprising (A) reacting (i) an acrylate of the general formula

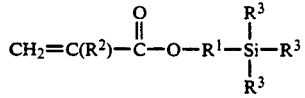

and mixtures thereof, and ii) an organic acrylate selected from the group consisting of

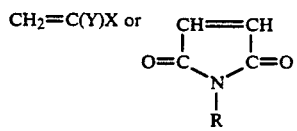

and mixtures thereof, in the presence of
iii) an initiator of the formula (R$^7$)$_3$SiZ, and
iv) a catalyst which is a source of fluoride, cyanide, azide or oxy anions;

(B) terminating said reaction by the introduction of a hydroxylic material and;

(C) recovering the reaction product from (B); wherein:

R$^1$ is selected from a straight or branched chain alkylene group having 1 to 6 carbons and an arylene group having 6 to 10 carbons; R$^2$ is selected from the methyl group and the hydrogen atom; each R$^3$ is independently selected from an alkyl or alkoxy group having 1 to 4 carbons and an aryl group having 6 to 10 carbons; R is selected from an alkyl, alkenyl, or alkadienyl group having 1 to 20 carbons and an aryl, alkaryl or aralkyl group having 6 to 20 carbons; any of said groups optionally containing one or more ether oxygen atoms within the aliphatic segments thereof; and optionally containing one or more functional substituents that are unreactive in said reaction; X is selected from —CN, —CH=CHC(O)X', and —C(O)X'; Y is selected from —H, —CH$_3$, —CN or —CO$_2$R provided that Y is —H or —CH$_3$ when X is —CH=CHC(O)X'; each R$^7$ is independently selected from an alkyl group having 1 to 10 carbons and an aryl or alkaryl group having 6 to 10 carbons; Z is selected from the group consisting essentially of

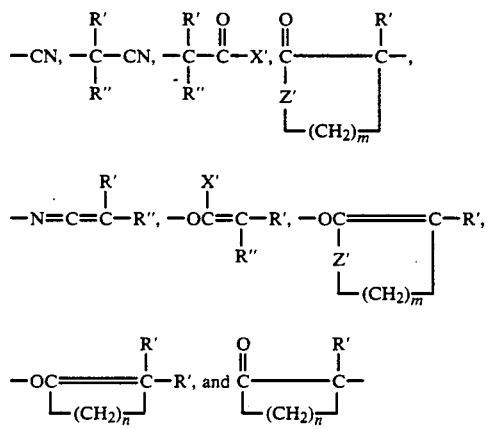

and mixtures thereof where

X' is —OSi(R$^7$)$_3$, —R, —OR, AND —NR$^5$R$^6$;

each of R' and R" is independently selected from the hydrogen atom, an alkyl or alkenyl group having 1 to 10 carbons, an aryl, alkaryl, and aralkyl group containing 6 to 10 carbons; any of said groups optionally containing one or more ether oxygen atoms within aliphatic segments thereof and optionally containing one or more functional substituents that are unreactive in said reaction;

Z' is selected from O and N;

m has the value of 2 to 4;

n has the value of 3 to 5;

each R$^5$ and R$^6$ are independently selected from an alkyl group having 1 to 4 carbons and;

R and R$^7$ are as defined above.

18. A process of making silicone acrylate polymeric materials comprising (A) reacting (i) a diacrylate of the general formula

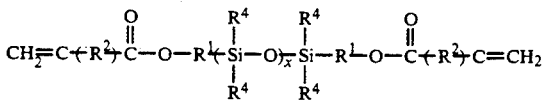

and mixtures thereof, in the presence of
ii) an initiator of the formula $(R^7)_3SiZ$, and
iii) a catalyst which is a source of fluoride, cyanide, azide or oxy anions and;
(B) recovering the reaction product from (B); wherein:
$R^1$ is selected from a straight or branched chain alkylene group having 1 to 6 carbons and an arylene group having 6 to 10 carbons; $R^2$ is selected from the methyl group and the hydrogen atom; each $R^4$ is independently selected from an alkyl group having 1 to 4 carbons and an aryl group having 6 to 10 carbons; each $R^7$ is independently selected from an alkyl group having 1 to 10 carbons and an aryl or alkaryl group having 6 to 10 carbons; and Z is selected from the group consisting essentially of

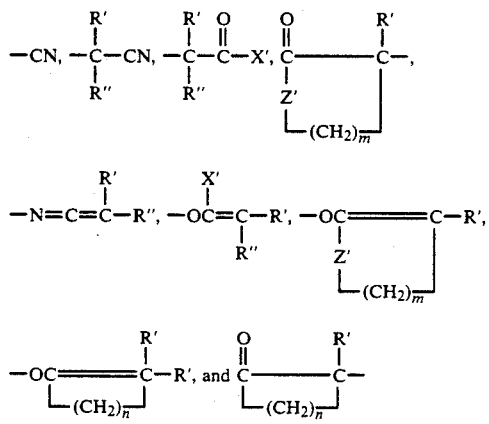

and mixtures thereof where
X' is $-OSi(R^7)_3$, $-R$, $-OR$, AND $-NR^5R^6$;
each of R' and R" is independently selected from the hydrogen atom, an alkyl or alkenyl group having 1 to 10 carbons, an aryl, alkaryl, and aralkyl group containing 6 to 10 carbons; any of said groups optionally containing one or more ether oxygen atoms within aliphatic segments thereof and optionally containing one or more functional substituents that are unreactive in said reaction;
Z' is selected from O and N;
m has the value of 2 to 4;
n has the value of 3 to 5;
each R is selected from an alkyl, alkenyl, or alkadienyl group having 1 to 20 carbons and an aryl, alkaryl or aralkyl group having 6 to 20 carbons; any of said groups optionally containing one or more ether oxygen atoms within the aliphatic segments thereof; and optionally containing one or more functional substituents that are unreactive in said reaction;
each $R^5$ and $R^6$ are independently selected from an alkyl group having 1 to 4 carbons and;
$R^7$ is as defined above.

19. A process as claimed in claim 18 wherein the initiator is of the formula

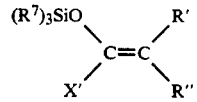

where $R^7$, R', R" and X' are as defined above.

20. A process as claimed in claim 18 wherein the catalyst is a source of oxy-anions.

21. A process as claimed in claim 20 wherein the catalyst is 3-chlorobenzoate.

22. A process as claimed in claim 18 wherein $R^1$ is propylene, $R^2$ is methyl and $R^4$ is methyl.

23. A process of making silicone acrylate polymeric materials comprising
(A) reacting
(i) a diacrylate of the general formula

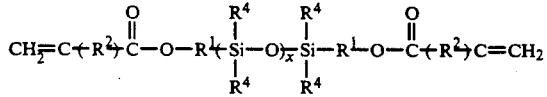

and mixtures thereof, in the presence of
ii) an initiator of the formula $(R^7)_3SiZ$, and
iii) a catalyst which is a source of fluoride, cyanide, azide or oxy anions;
(B) terminating said reaction by the introduction of a hydroxylic material and;
(C) recovering the reaction product of (B). wherein:
$R^1$ is selected from a straight or branched chain alkylene group having 1 to 6 carbons and an arylene group having 6 to 10 carbons; $R^2$ is selected from the methyl group and the hydrogen atom; each $R^4$ is independently selected from an alkyl group having 1 to 4 carbons and an aryl group having 6 to 10 carbons; each $R^7$ is independently selected from an alkyl group having 1 to 10 carbons and an aryl or alkaryl group having 6 to 10 carbons; and Z is selected from the group consisting essentially of

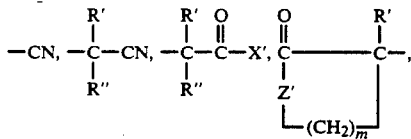

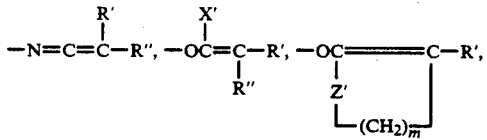

and mixtures thereof where
X' is $-OSi(R^7)_3$, $-R$, $-OR$, AND $-NR^{R6}$;
each of R' and R" is independently selected from the hydrogen atom, an alkyl or alkenyl group having 1 to 10 carbons, an aryl, alkaryl, and aralkyl group containing 6 to 10 carbons; any of said groups optionally containing one or more ether oxygen atoms within aliphatic segments thereof and optionally containing one or more functional substituents that are unreactive in said reaction;

Z' is selected from O and N;

m has the value of 2 to 4;

n has the value of 3 to 5;

each R is selected from an alkyl, alkenyl, or alkadienyl group having 1 to 20 carbons and an aryl, alkaryl or aralkyl group having 6 to 20 carbons; any of said groups optionally containing one or more ether oxygen atoms within the aliphatic segments thereof; and optionally containing one or more functional substituents that are unreactive in said reaction;

each $R^5$ and $R^6$ are independently selected from an alkyl group having 1 to 4 carbons and;

$R^7$ is as defined above.

24. A process of making silicone acrylate polymeric materials comprising (A) reacting (i) a diacrylate of the general formula $$CH_2=C(R^2)C(O)-O-R^1(Si(R^4)_2-O)_x Si(R^4)_2-R^1-O-C(O)(R^2)C=CH_2$$

and mixtures thereof, and ii) an organic acrylate selected from the group consisting of $$CH_2=C(Y)X \text{ or } \begin{array}{c} CH=CH \\ | \quad\quad | \\ O=C \quad C=O \\ \diagdown N \diagup \\ | \\ R \end{array}$$

and mixtures thereof, in the presence of iii) an initiator of the formula $(R^7)_3SiZ$, and iv) a catalyst which is a source of fluoride, cyanide, azide or oxy anions; and (B) recovering the reaction product of (A); wherein: $R^1$ is selected from a straight or branched chain alkylene group having 1 to 6 carbons and an arylene group having 6 to 10 carbons; $R^2$ is selected from the methyl group and the hydrogen atom; each $R^4$ is independently selected from an alkyl group having 1 to 4 carbons and an aryl group having 6 to 10 carbons; R is selected from an alkyl, alkenyl, or alkadienyl group having 1 to 20 carbons and an aryl, alkaryl or aralkyl group having 6 to 20 carbons; any of said groups optionally containing one or more ether oxygen atoms within the aliphatic segments thereof; and optionally containing one or more functional substituents that are unreactive in said reaction; X is selected from —CN, —CH=CHC(O)X', and —C(O)X'; Y is selected from —H, —CH$_3$, —CN or —CO$_2$R provided that Y is —H or —CH$_3$ when X is —CH=CHC(O)X'; each $R^7$ is independently selected from an alkyl group having 1 to 10 carbons and an aryl or alkaryl group having 6 to 10 carbons; Z is selected from the group consisting essentially of $$-CN, \; -\overset{R'}{\underset{R''}{C}}-CN, \; -\overset{R'}{\underset{R''}{C}}-\overset{O}{\overset{\|}{C}}-X', \; \overset{O}{\overset{\|}{C}}\underset{\underset{(CH_2)_m}{|}}{\overset{|}{\phantom{C}}}\overset{R'}{\underset{|}{C}}-,$$

$$-N=C=C-R'', \; -O\overset{X'}{\underset{R''}{C}}=C-R', \; -O\overset{R'}{\underset{\underset{(CH_2)_m}{|}}{C}}=\overset{}{\overset{}{C}}-R',$$

$$-O\overset{R'}{\underset{\underset{(CH_2)_n}{|}}{C}}=\overset{}{\overset{}{C}}-R', \text{ and } \overset{O}{\overset{\|}{C}}\underset{\underset{(CH_2)_n}{|}}{\overset{|}{\phantom{C}}}\overset{R'}{\underset{|}{C}}-$$

and mixtures thereof where

X' is —OSi(R$^7$)$_3$, —R, —OR, AND —NR$^5$R$^6$;

each of R' and R'' is independently selected from the hydrogen atom, an alkyl or alkenyl group having 1 to 10 carbons, an aryl, alkaryl, and aralkyl group containing 6 to 10 carbons; any of said groups optionally containing one or more ether oxygen atoms within aliphatic segments thereof and optionally containing one or more functional substituents that are unreactive in said reaction;

Z' is selected from O and N;

m has the value of 2 to 4;

n has the value of 3 to 5;

each $R^5$ and $R^6$ are independently selected from an alkyl group having 1 to 4 carbons and;

R and $R^7$ are as defined above.

25. A process as claimed in claim 24 wherein the initiator is of the formula $$\begin{array}{c} (R^7)_3SiO \diagdown \quad \diagup R' \\ C=C \\ \diagup \quad \diagdown \\ X' \quad\quad R'' \end{array}$$

where $R^7$, R', R'' and X' are as defined above.

26. A process as claimed in claim 24 wherein the catalyst is a source of oxy-anions.

27. A process as claimed in claim 26 wherein the catalyst is 3-chlorobenzoate.

28. A process as claimed in claim 24 wherein $R^1$ is propylene, $R^2$ is methyl and $R^4$ is methyl.

29. A process as claimed in claim 24 wherein the organic acrylate is methyl methacrylate.

30. A process of making silicone acrylate polymeric materials comprising (A) reacting (i) a diacrylate of the general formula $$CH_2=C(R^2)C(O)-O-R^1(Si(R^4)_2-O)_x Si(R^4)_2-R^1-O-C(O)(R^2)C=CH_2$$

and mixtures thereof, and ii) an organic acrylate selected from the group consisting of $$CH_2=C(Y)X \text{ or}$$

[structure: CH=CH with O=C—N(R)—C=O ring]

and mixtures thereof, in the presence of iii) an initiator of the formula $(R^7)_3SiZ$, and iv) a catalyst which is a source of fluoride, cyanide, azide or oxy anions;

(B) terminating said reaction by the introduction of a hydroxylic material and;

(C) recovering the reaction product of (B); wherein: $R^1$ is selected from a straight or branched chain alkylene group having 1 to 6 carbons and an arylene group having 6 to 10 carbons; $R^2$ is selected from the methyl group and the hydrogen atom; each $R^4$ is independently selected from an alkyl group having 1 to 4 carbons and an aryl group having 6 to 10 carbons; R is selected from an alkyl, alkenyl, or alkadienyl group having 1 to 20 carbons and an aryl, alkaryl or aralkyl group having 6 to 20 carbons; any of said groups optionally containing one or more ether oxygen atoms within the aliphatic segments thereof; and optionally containing one or more functional substituents that are unreactive in said reaction; X is selected from —CN, —CH=CHC(O)X', and —C(O)X'; Y is selected from —H, —CH$_3$, —CN or —CO$_2$R provided that Y is —H or —CH$_3$ when X is —CH=CHC(O)X'; each $R^7$ is independently selected from an alkyl group having 1 to 10 carbons and an aryl or alkaryl group having 6 to 10 carbons; Z is selected from the group consisting essentially of $$-CN, \; -\underset{R''}{\underset{|}{C}}(R')-CN, \; -\underset{R''}{\underset{|}{C}}(R')-\underset{}{\overset{O}{\overset{\|}{C}}}-X', \; \underset{\underset{(CH_2)_m}{\overline{\phantom{XX}}}}{\overset{O}{\overset{\|}{C}}-\underset{Z'}{\underset{|}{C}}-\underset{}{\overset{R'}{\overset{|}{C}}}-},$$

-continued $$-N=C=C(R'')-R'', \; -OC=C(R'')-R', \; -OC=\!\!=\!\!C(Z'(CH_2)_m)-R',$$

$$-OC=\!\!=\!\!C((CH_2)_n)-R', \text{ and } \overset{O}{\overset{\|}{C}}-\underset{(CH_2)_n}{\underset{|}{C}}(R')-$$

and mixtures thereof where

X' is —OSi$(R^7)_3$, —R, —OR, AND —NR$^5$R$^6$;

each of R' and R'' is independently selected from the hydrogen atom, an alkyl or alkenyl group having 1 to 10 carbons, an aryl, alkaryl, and aralkyl group containing 6 to 10 carbons; any of said groups optionally containing one or more ether oxygen atoms within aliphatic segments thereof and optionally containing one or more functional substituents that are unreactive in said reaction;

Z' is selected from O and N;

m has the value of 2 to 4;

n has the value of 3 to 5;

each $R^5$ and $R^6$ are independently selected from an alkyl group having 1 to 4 carbons and;

R and $R^7$ are as defined above.

31. A silicone acrylate polymer prepared by the method of claim 1.

32. A silicone acrylate polymer prepared by the method of claim 6.

33. A silicone acrylate polymer prepared by the method of claim 7.

34. A silicone acrylate polymer prepared by the method of claim 17.

35. A silicone acrylate polymer prepared by the method of claim 18.

36. A silicone acrylate polymer prepared by the method of claim 23.

37. A silicone acrylate polymer prepared by the method of claim 24.

38. A silicone acrylate polymer prepared by the method of claim 30.

* * * * *